US011442610B2

(12) United States Patent
Qiu et al.

(10) Patent No.: US 11,442,610 B2
(45) Date of Patent: Sep. 13, 2022

(54) VIRTUAL ITEM ADJUSTMENT METHOD AND APPARATUS, TERMINAL, AND STORAGE MEDIUM

(71) Applicant: Tencent Technology (Shenzhen) Company Limited, Shenzhen (CN)

(72) Inventors: Meng Qiu, Shenzhen (CN); Ya Zhang, Shenzhen (CN); Jiaqi Pan, Shenzhen (CN); Junming Wang, Shenzhen (CN); Shuting Zhang, Shenzhen (CN); Qinghua Xiao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/006,292

(22) Filed: Aug. 28, 2020

(65) Prior Publication Data

US 2020/0393959 A1    Dec. 17, 2020

Related U.S. Application Data

(63) Continuation of application No. PCT/CN2019/098018, filed on Jul. 26, 2019.

(30) Foreign Application Priority Data

Aug. 8, 2018    (CN) .......................... 201810898360.6

(51) Int. Cl.
*G06F 3/0484*     (2022.01)
*G06F 3/0488*     (2022.01)
(Continued)

(52) U.S. Cl.
CPC ........ *G06F 3/04847* (2013.01); *G06F 3/0488* (2013.01); *G06F 3/04842* (2013.01); *G06Q 30/0643* (2013.01)

(58) Field of Classification Search
CPC .. A63F 13/2145; A63F 13/426; A63F 13/822; A63F 13/5255; A63F 13/69;
(Continued)

(56) References Cited

U.S. PATENT DOCUMENTS

2009/0221367 A1* 9/2009 Longley .............. G07F 17/3276
463/32
2009/0318234 A1* 12/2009 Christensen .......... A63F 13/533
463/42

(Continued)

FOREIGN PATENT DOCUMENTS

CN         105214306 A       1/2016
CN         105498211 A       4/2016
(Continued)

OTHER PUBLICATIONS

Tencent Technology, WO, PCT/CN2019/098018, dated Aug. 27, 2019, 5 pgs.

(Continued)

*Primary Examiner* — Sang H Kim
(74) *Attorney, Agent, or Firm* — Morgan, Lewis & Bockius LLP

(57) ABSTRACT

Embodiments of this application disclose a virtual item adjustment method performed at a computing device having a touchscreen. The method including: displaying a virtual object presenting interface on the touchscreen, the virtual object presenting interface comprising a first virtual object and a second virtual object, the first virtual object and the second virtual object being two virtual objects respectively controlled by two different user accounts; receiving a slide operation signal on the touchscreen, the slide operation signal having a start position on the second virtual object and an end position on the first virtual object; and adjusting a virtual item of the first virtual object according to a virtual item of the second virtual object. The embodiments of this (Continued)

application implement the function of adjusting a virtual item of a virtual object only through a slide operation. Therefore, the operation simpler and more efficient.

17 Claims, 7 Drawing Sheets

(51) Int. Cl.
*G06Q 30/06* (2012.01)
*G06F 3/04847* (2022.01)
*G06F 3/04842* (2022.01)

(58) Field of Classification Search
CPC ............... A63F 13/792; G06F 3/04847; G06F 3/04842; G06F 3/0488; G06Q 30/0643
See application file for complete search history.

(56) References Cited

U.S. PATENT DOCUMENTS

| | | | | |
|---|---|---|---|---|
| 2011/0010270 A1* | 1/2011 | Hamilton, II | ...... | G06Q 30/0633 705/26.63 |
| 2011/0246329 A1* | 10/2011 | Geisner | ................. | G06F 3/017 715/757 |
| 2013/0254648 A1* | 9/2013 | Amacker | ................ | G06F 3/017 715/234 |
| 2015/0379623 A1* | 12/2015 | Gadre | ................ | G06Q 30/0641 705/27.2 |
| 2018/0104573 A1* | 4/2018 | Jeffery | ................. | A63F 13/812 |
| 2018/0137515 A1* | 5/2018 | Higgins | ............. | G06Q 30/0641 |
| 2019/0314723 A1* | 10/2019 | Suzuki | .................. | A63F 13/822 |

FOREIGN PATENT DOCUMENTS

| | | |
|---|---|---|
| CN | 105597310 A | 5/2016 |
| CN | 107899237 A | 4/2018 |
| CN | 109107155 A | 1/2019 |
| JP | 2012504802 A | 2/2012 |
| JP | 5838283 B1 | 1/2016 |
| JP | 2016202875 A | 12/2016 |
| WO | WO 2018103634 A1 | 6/2018 |

OTHER PUBLICATIONS

Tencent Technology, IPRP, PCT/CN2019/098018, dated Feb. 2, 2021, 6 pgs.
Tencent Technology, ISR, PCT/CN2019/098018, datec Oct 29, 2019, 2 pgs.
Playstation.Blog, "Tournaments, Character Customization, Online. Thorough Elucidation of the Three Elements of 'New Everybody's Golf'!", Jul. 27, 2017, 9 pgs., Retrieved from the Internet: https://blog.ja.playstation.com2017/07/27/20170727-newmingol/.

* cited by examiner

VIRTUAL ITEM ADJUSTMENT METHOD AND APPARATUS, TERMINAL, AND STORAGE MEDIUM

CROSS REFERENCE TO RELATED APPLICATIONS

This application is a continuation application of PCT Patent Application No. PCT/CN2019/098018, entitled "METHOD AND APPARATUS FOR ADJUSTING VIRTUAL ARTICLES, TERMINAL AND STORAGE MEDIUM" filed on Jul. 26, 2019, which claims priority to Chinese Patent Application No. 201810898360.6, entitled "VIRTUAL ITEM ADJUSTMENT METHOD AND APPARATUS, TERMINAL, AND STORAGE MEDIUM" filed on Aug. 8, 2018, all of which are incorporated by reference in their entirety.

FIELD OF THE TECHNOLOGY

Embodiments of this application relate to the field of terminal technologies, and in particular, to a virtual item adjustment method and apparatus, a terminal, and a storage medium.

BACKGROUND OF THE DISCLOSURE

Currently, a virtual object controlled by a user in a game application may wear virtual clothing, to enhance the authenticity and aesthetics of the virtual object.

The user may adjust the virtual clothing worn by the virtual object according to an actual requirement. In the related art, a method below is used for adjusting virtual clothing: a terminal, after receiving a backpack opening instruction triggered by a user, opens a virtual backpack and displays a corresponding backpack interface, the backpack interface including virtual clothing for selection, such as tops, trousers, shoes, hats, and accessories; the user selects target virtual clothing to be worn from the backpack interface according to an actual requirement, and correspondingly, the terminal, after receiving a selection instruction corresponding to the target virtual clothing, controls a virtual object to wear the target virtual clothing.

According to the virtual clothing adjustment method provided in the foregoing related art, a user is required to open a backpack and select virtual clothing to be worn from the backpack. The operation is relatively complex and inefficient.

SUMMARY

Embodiments of this application provide a virtual item adjustment method and apparatus, a terminal, and a storage medium, which can be used for resolving the problem in the related art that an operation of adjusting virtual items such as virtual clothing is relatively complex and inefficient. The technical solutions are as follows:

According to one aspect, an embodiment of this application provides a virtual item adjustment method, applied to a computing device having a touchscreen, the method including:

displaying a virtual object presenting interface on the touchscreen, the virtual object presenting interface comprising a first virtual object and a second virtual object, the first virtual object and the second virtual object being two virtual objects respectively controlled by two different user accounts;

receiving a slide operation signal on the touchscreen, the slide operation signal having a start position on the second virtual object and an end position on the first virtual object; and adjusting a virtual item of the first virtual object according to a virtual item of the second virtual object.

According to still another aspect, an embodiment of this application provides a computing device comprising one or more processors, a touchscreen, memory and a plurality of computer programs stored in the memory that, when executed by the one or more processors, cause the computing device to perform the virtual item adjustment method in the foregoing aspect.

According to yet another aspect, an embodiment of this application provides a non-transitory computer-readable storage medium, storing a plurality of computer programs that, when executed by one or more processors of a computing device having a touchscreen, cause the computing device to perform the virtual item adjustment method in the foregoing aspect.

According to still yet another aspect, an embodiment of this application provides a computer program product, when executed, the computer program product being used for performing the virtual item adjustment method in the foregoing aspect.

In the technical solutions provided in the embodiments of this application, when a slide operation signal of which a start position is on a second virtual object and of which an end position is on a first virtual object is received, a virtual item of the first virtual object and/or a virtual item of the second virtual object are/is adjusted, so that the function of adjusting a virtual item of a virtual object is implemented only through a slide operation. Therefore, the operation becomes simpler and more efficient.

DESCRIPTION OF EMBODIMENTS

Figure 1:
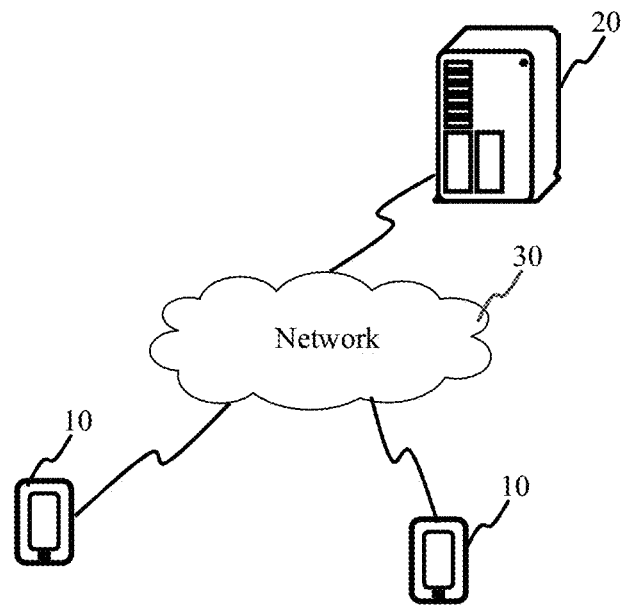
FIG. 1 is a schematic diagram of an implementation environment according to an embodiment of this application.

The following further describes implementations of this application in detail with reference to the accompanying drawings.

Before embodiments of this application are described, related terms involved in this application are explained first.

1. Virtual Object

A virtual object is a virtual character controlled by a user account in an application. For example, the application is a game application. The virtual object is a game character controlled by the user account in the game application. The virtual object may be in a human shape, an animal shape, a cartoon shape, or another shape. This is not limited in the embodiments of this application. The virtual object may be presented in a three-dimensional form or in a two-dimensional form. This is not limited in the embodiments of this application.

In different game applications, operations performed by virtual objects controlled by a user account may be different. For example, in a shooting game application, the user account may control a virtual object to perform operations such as shooting, running, jumping, gun picking up, gun replacing, and ammunition filling; and in a multiplayer online battle arena (MOBA) game application, the user account may control a virtual object to perform operations such as moving, skill releasing, enemy killing, and enemy turret destroying.

Certainly, apart from game applications, another type of application can also present a virtual object to a user and provide a corresponding function for the virtual object. For example, the foregoing application may be an augmented reality (AR) application, a social networking application, an interactive entertainment application, or the like. This is not limited in the embodiments of this application. Besides, shapes as well as corresponding functions of virtual objects provided by different applications are different and may be preset according to an actual requirement. This is not limited in the embodiments of this application.

2. Virtual Item

A virtual item is an item with which a virtual object is outfitted. The virtual item includes, but is not limited to, at least one of the following: virtual clothing, virtual equipment, a character skin, and a virtual pet. The virtual clothing may be clothes and decorations worn on different parts of the virtual object, such as tops, trousers, shoes, hats, and accessories. The virtual equipment is equipment carried by the virtual object, such as a weapon, a vehicle, or another hand-held item. In a game application, the virtual equipment may be game equipment. The game equipment may be equipment of different types, such as a gun, a bow, a blade, a sword, and an ax. The character skin is an appearance of the virtual object. The virtual pet is a pet possessed by the virtual object, for example, an animal such as a cat, a dog, or a rabbit, or a cartoon-shaped virtual creature. In different applications, types, species, and patterns of virtual items may be different. This is not limited in the embodiments of this application.

FIG. 1 is a schematic diagram of an implementation environment according to an embodiment of this application. The implementation environment may include a terminal 10 and a server 20.

The terminal 10 may be an electronic device such as a mobile phone, a tablet computer, a game console, an ebook reader, a multimedia player, a wearable device, and a personal computer (PC). A client of a game application may be installed on the terminal 10.

The server 20 is configured to provide a back-end service to a client of an application (for example, a game application) in the terminal 10. For example, the server 20 may be a back-end server of the foregoing application (for example, the game application). The server 20 may be one server, a server cluster including a plurality of servers, or a cloud computing service center.

The terminal 10 may communicate with the server 20 through a network 30. The network 30 may be a wired network, or a wireless network.

Figure 2:
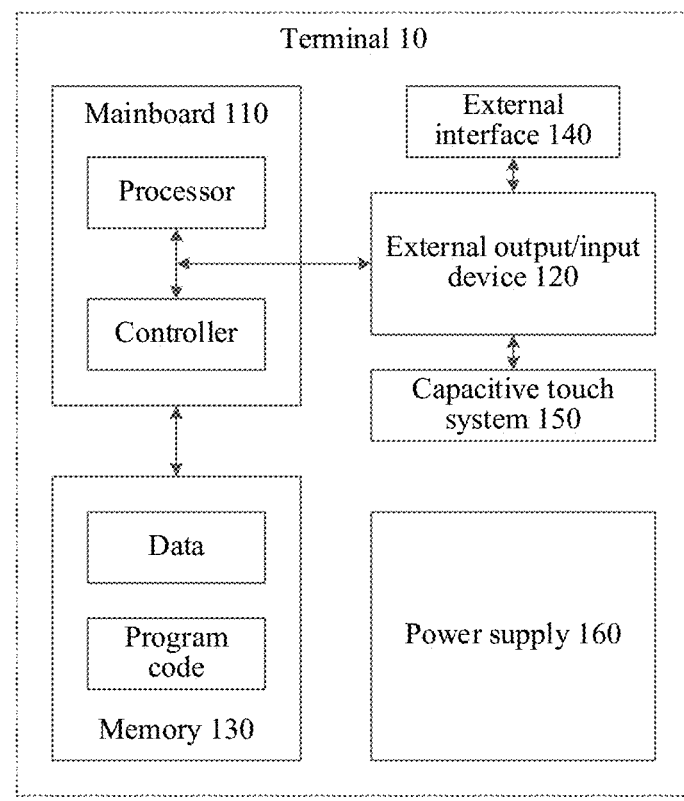
FIG. 2 is a schematic structural diagram of a terminal according to an embodiment of this application.

In the method embodiments of this application, an execution body of each step may be a terminal. FIG. 2 is a schematic structural diagram of a terminal according to an embodiment of this application. The terminal 10 may include a mainboard 110, an external output/input device 120, a memory 130, an external interface 140, a touchscreen or a capacitive touch system 150, and a power supply 160.

Processing elements such as a processor and a controller are integrated in the mainboard 110.

The external output/input device 120 may include a display component (for example, a display), a sound playing component (for example, a speaker), a sound acquisition component (for example, a microphone), and various types of buttons.

The memory 130 stores program code and data.

The external interface 140 may include an earphone interface, a charging interface, a data interface, and the like.

The capacitive touch system 150 may be integrated in the display component or the buttons of the external output/input device 120, and the capacitive touch system 150 is configured to detect a touch operation performed by a user on the display component or the buttons.

The power supply 160 is configured to supply power to other components in the terminal 10.

In the embodiments of this application, the processor in the mainboard 110 may generate a user interface (UI) (for example, a game interface) by executing or invoking the program code and data stored in the memory, and present the generated UI (for example, the game interface) by using the external output/input device 120. During presentation of the UI (for example, the game interface), a touch operation performed during interaction between a user and the UI (for example, the game interface) may be detected through the capacitive touch system 150; or a clicking or input operation performed during interaction between a user and the UI (for example, the game interface) may be received through an external input device such as a mouse and a keyboard.

Figure 3:
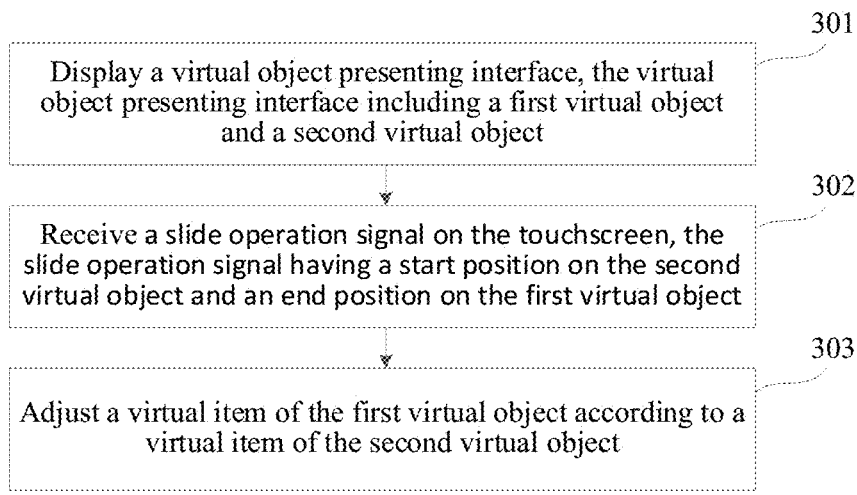
FIG. 3 is a flowchart of a virtual item adjustment method according to an embodiment of this application.

FIG. 3 is a flowchart of a virtual item adjustment method according to an embodiment of this application. The method may be applied to the terminal described above, for example, to a client of an application on the terminal. The application may be any application described above that can present a virtual object to a user. The method may include the following steps.

Step 301. Display a virtual object presenting interface on the touchscreen, the virtual object presenting interface including a first virtual object and a second virtual object.

The virtual object presenting interface is a UI that is of an application and that is used for presenting a virtual object. In this embodiment of this application, the virtual object presenting interface includes the first virtual object and the second virtual object.

In one example, the first virtual object and the second virtual object are two virtual objects controlled by the same user account. For example, the user account may be a user account currently logged in to an application run by a terminal.

In another example, the first virtual object and the second virtual object are two virtual objects respectively controlled by two different user accounts. Optionally, the first virtual object is controlled by a first user account, and the second virtual object is controlled by a second user account. The first user account and the second user account are two different user accounts. In one example, the first user account is a user account currently logged in to an application run by a terminal, and the second user account is a user account currently logged in to the application run by another terminal.

In addition, apart from the first virtual object and the second virtual object described above, the virtual object presenting interface may further include another virtual object or another interface element. This is not limited in this embodiment of this application.

Step 302. Receive a slide operation signal on the touchscreen, the slide operation signal having a start position on the second virtual object and an end position on the first virtual object.

In this embodiment of this application, a virtual item with which the virtual object is outfitted is adjusted through the slide operation signal.

The start position of the slide operation signal is a position of a starting point of a slide track of the slide operation signal, and the end position of the slide operation signal is a position of an end point of the slide track of the slide operation signal.

The terminal may determine whether the start position of the slide operation signal is on the second virtual object by using the following manner. The terminal acquires a coordinate of the start position of the slide operation signal and a second display region corresponding to the second virtual object; detects whether the coordinate of the start position is located in the second display region; determines that the start position of the slide operation signal is on the second virtual object if the coordinate of the start position is located in the second display region; and determines that the start position of the slide operation signal is not on the second virtual object if the coordinate of the start position is located beyond the second display region.

Similarly, the terminal may determine whether the end position of the slide operation signal is on the first virtual object by using the following manner. The terminal acquires a coordinate of the end position of the slide operation signal and a first display region corresponding to the first virtual object; detects whether the coordinate of the end position is located in the first display region; determines that the end position of the slide operation signal is on the first virtual object if the coordinate of the end position is located in the first display region; and determines that the end position of the slide operation signal is not on the first virtual object if the coordinate of the end position is located beyond the first display region.

In addition, in some embodiments, after receiving a slide operation signal, a start position thereof being on the second virtual object, stopping time thereof at the start position being longer than a preset duration, an end position thereof being on the first virtual object, the terminal performs step 303 below. That is, a user first performs a long press operation acting on the second virtual object, and then performs a slide operation from the second virtual object to the first virtual object. A finger of the user does not leave a screen of the terminal in a period between the touch and hold operation and the slide operation. The user triggers the terminal to perform step 303 below through the foregoing operations, which can reduce misoperations to some extent.

Step 303. Adjust a virtual item of the first virtual object according to a virtual item of the second virtual object.

After receiving the slide operation signal conforming to the foregoing conditions, the terminal adjusts a virtual item of at least one virtual object of the first virtual object and the second virtual object. For example, the terminal may adjust the virtual item of the first virtual object according to the virtual item of the second virtual object; or the terminal may alternatively adjust the virtual item of the second virtual object according to the virtual item of the first virtual object; or the terminal may adjust both the virtual item of the first virtual object and the virtual item of the second virtual object according to the virtual item of the first virtual object and the virtual item of the second virtual object.

Besides, the virtual item includes, but is not limited to, at least one of the following: virtual clothing, virtual equipment, a character skin, and a virtual pet. This is not limited in this embodiment of this application. For descriptions of the virtual item, reference may be made to the description above, and details are not described herein.

Based on the above, in the technical solutions provided in this embodiment of this application, when a slide operation signal of which a start position is on a second virtual object and of which an end position is on a first virtual object is received, a virtual item of the first virtual object and/or a virtual item of the second virtual object are/is adjusted, so that the function of adjusting a virtual item of a virtual object is implemented only through a slide operation. Therefore, the operation becomes simpler and more efficient.

Figure 4:
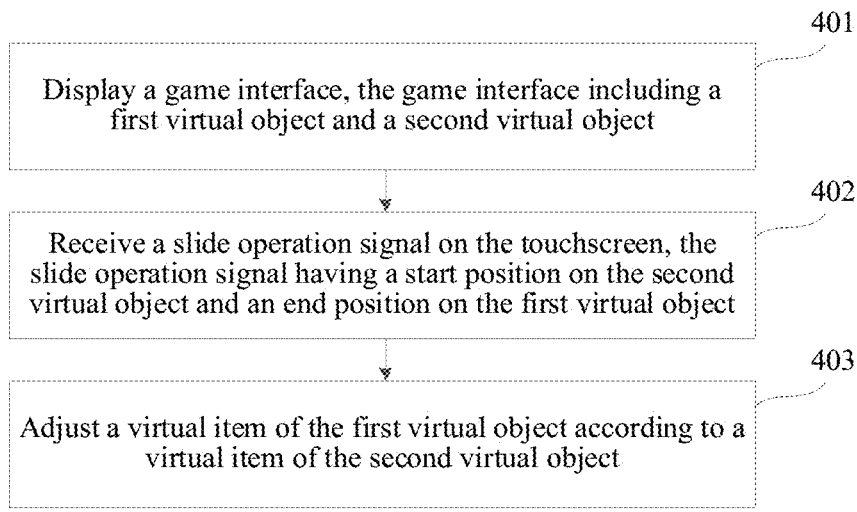
FIG. 4 is a flowchart of a virtual item adjustment method according to another embodiment of this application.

FIG. 4 is a flowchart of a virtual item adjustment method according to another embodiment of this application. The method may be applied to the terminal described above, such as a client of an application on the terminal. The method may include the following steps.

Step 401. Display a game interface, the game interface including a first virtual object and a second virtual object.

The game interface is a UI of a game application. In this embodiment of this application, a particular UI of the game application is not specifically limited as the game interface. Using a match-up game application as an example, the game interface may be a UI displayed before a match-up starts, or a UI displayed after a match-up starts.

The first virtual object and the second virtual object are two virtual objects respectively controlled by two different user accounts. Optionally, the first virtual object is controlled by a first user account, and the second virtual object is controlled by a second user account. The first user account and the second user account are two different user accounts. In one example, the first user account is a user account currently logged in to a game application run by a terminal, and the second user account is a user account currently logged in to the game application run by another terminal.

Optionally, there is an association relationship between the first virtual object and the second virtual object. The association relationship includes, but not is limited to, any of the following: a relationship of belonging to the same team, a relationship of belonging to the same game match-up, a friendship, and a master-apprentice relationship.

Step 402. Receive a slide operation signal on the touchscreen, the slide operation signal having a start position on the second virtual object and an end position on the first virtual object.

In this embodiment of this application, a virtual item with which the virtual object is outfitted is adjusted through the slide operation signal.

The start position of the slide operation signal is a position of a starting point of a slide track of the slide operation signal, and the end position of the slide operation signal is a position of an end point of the slide track of the slide operation signal.

The terminal may determine whether the start position of the slide operation signal is on the second virtual object by using the following manner. The terminal acquires a coordinate of the start position of the slide operation signal and a second display region corresponding to the second virtual object; detects whether the coordinate of the start position is located in the second display region; determines that the start position of the slide operation signal is on the second virtual object if the coordinate of the start position is located in the second display region; and determines that the start position of the slide operation signal is not on the second virtual object if the coordinate of the start position is located beyond the second display region.

Similarly, the terminal may determine whether the end position of the slide operation signal is on the first virtual object by using the following manner. The terminal acquires a coordinate of the end position of the slide operation signal and a first display region corresponding to the first virtual object; detects whether the coordinate of the end position is located in the first display region; determines that the end position of the slide operation signal is on the first virtual object if the coordinate of the end position is located in the first display region; and determines that the end position of the slide operation signal is not on the first virtual object if the coordinate of the end position is located beyond the first display region.

Figure 5:
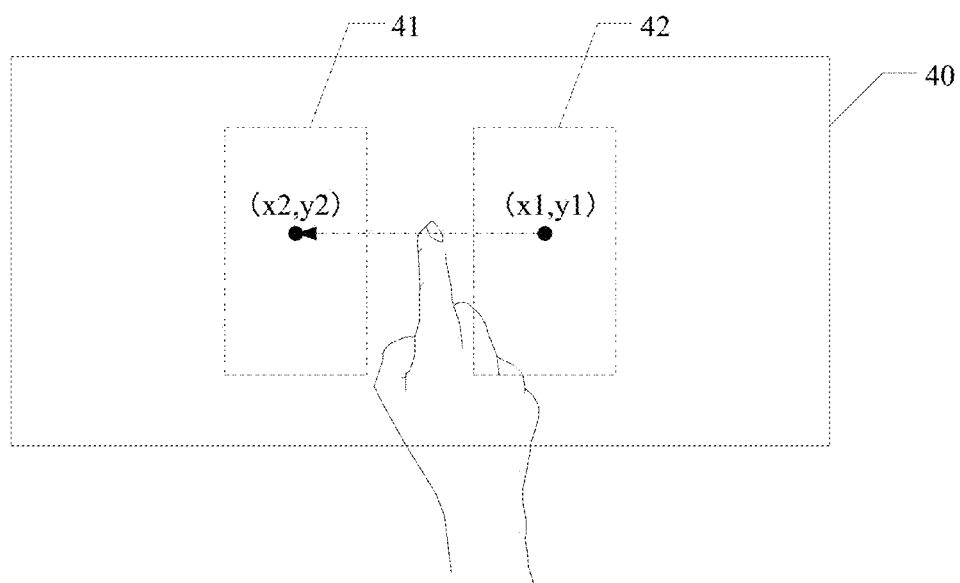
FIG. 5 is a schematic exemplary diagram of a slide operation signal.

For example, as shown in FIG. 5, it is assumed that in a game interface 40, a first display region 41 corresponding to the first virtual object and a second display region 42 corresponding to the second virtual object are separately shown in the figure. The terminal receives a slide operation signal. A coordinate of a start position of the slide operation signal is (x1, y1), and a coordinate of an end position of the slide operation signal is (x2, y2). Because (x1, y1) is located in the second display region 42, and (x2, y2) is located in the first display region 41, the terminal, after receiving the slide operation signal, performs step 403 below.

In addition, in some embodiments, after receiving a slide operation signal, a start position thereof being on the second virtual object, stopping time thereof at the start position being longer than a preset duration, an end position thereof being on the first virtual object, the terminal performs step 403 below. That is, a user first performs a long press operation acting on the second virtual object, and then performs a slide operation from the second virtual object to the first virtual object. A finger of the user does not leave a screen of the terminal in a period between the touch and hold operation and the slide operation. The user triggers the terminal to perform step 403 below through the foregoing operations, which can reduce misoperations to some extent.

Step 403. Adjust a virtual item of the first virtual object according to a virtual item of the second virtual object.

After receiving the slide operation signal conforming to the foregoing conditions, the terminal adjusts a virtual item of at least one virtual object of the first virtual object and the second virtual object. For example, the terminal may adjust the virtual item of the first virtual object according to the virtual item of the second virtual object; or the terminal may alternatively adjust the virtual item of the second virtual object according to the virtual item of the first virtual object; or the terminal may adjust both the virtual item of the first virtual object and the virtual item of the second virtual object according to the virtual item of the first virtual object and the virtual item of the second virtual object.

Besides, in a game application, the virtual item includes, but is not limited to, at least one of the following: clothing, equipment, a skin, a pet, and the like of a game character. This is not limited in this embodiment of this application. When the virtual item is clothing of a game character, clothes of the game character can be changed through one step of slide operation, without selecting clothes to be worn from a backpack. Therefore, the operation efficiency is significantly improved.

Based on the above, in the technical solutions provided in this embodiment of this application, when a slide operation signal of which a start position is on a second virtual object and of which an end position is on a first virtual object is received, a virtual item of the first virtual object and/or a virtual item of the second virtual object are/is adjusted, so that the function of adjusting a virtual item of a virtual object is implemented only through a slide operation. Therefore, the operation becomes simpler and more efficient.

In an optional embodiment provided based on the embodiment in FIG. 3 or the embodiment in FIG. 4, the foregoing step 303 or the foregoing step 403 may be replaced and implemented by the following step: adjusting the virtual item of the first virtual object to render an adjusted virtual item of the first virtual object the same as the virtual item of the second virtual object.

Optionally, using an example in which the virtual item is virtual clothing, the terminal adjusts virtual clothing of the first virtual object to be the same as that of the second virtual object, so that the function of quickly changing clothing for the first virtual object is implemented.

In addition, considering that there may be a plurality of virtual items with which the virtual object may be outfitted, for example, body parts such as the head, the upper body, the lower body, and the feet are respectively outfitted with virtual clothing such as a hat, a top, trousers, and shoes, there may be two possible implementations in the following for the terminal to adjust the virtual items of the first virtual object.

In a first possible implementation, the terminal adjusts all virtual items of the first virtual object, to render all adjusted virtual items of the first virtual object the same as all virtual items of the second virtual object.

Figure 6:
FIG. 6 is a schematic exemplary diagram of a virtual item adjustment interface.

For example, as shown in FIG. 6, the terminal displays a team interface 50 of a game application. The team interface 50 includes a first virtual object 51 corresponding to a first user account currently logged in to the game application and a second virtual object 52 in a state of teaming with the first virtual object 51. A user taps/clicks and long presses virtual clothing of the second virtual object 52 and performs a slide operation to the left. Correspondingly, the terminal receives a slide operation signal. In a process of receiving the slide operation signal, the terminal may generate an image corresponding to the virtual clothing of the second virtual object 52, and moves the image along a slide track following a finger of the user. When the finger of the user reaches the first virtual object 51, the finger of the user leaves away from a screen. The terminal changes virtual clothing originally worn by the first virtual object 51 as the virtual clothing of the second virtual object 52, so that the first virtual object 51 and the second virtual object 52 wear the same virtual clothing.

In a second possible implementation, the terminal adjusts a virtual item on a target part of the first virtual object to render an adjusted virtual item on the target part of the first virtual object the same as a virtual item on a target part of the second virtual object. Optionally, the target part is a part where the start position of the slide operation signal is located on the second virtual object, or the target part is a part where the end position of the slide operation signal is located on the first virtual object. For example, when the part where the start position of the slide operation signal is located on the second virtual object is the upper body, and the part where the end position of the slide operation signal is located on the first virtual object is also the upper body, the terminal adjusts a virtual item (for example, a top) of the upper body of the first virtual object to render an adjusted virtual item of the upper body of the first virtual object the same as a virtual item of the upper body of the second virtual object.

Optionally, when the part where the start position of the slide operation signal is located on the second virtual object is the same as the part where the end position of the slide operation signal is located on the first virtual object, the terminal adjusts a virtual item on the same part described above of the first virtual object and/or the second virtual object; otherwise, when the part where the start position of the slide operation signal is located on the second virtual object is different from the part where the end position of the slide operation signal is located on the first virtual object, the terminal does not perform the virtual item adjustment operation and terminates the flow. A virtual item on a particular part of a virtual object rather than all virtual items of the virtual object can be adjusted by using the foregoing method.

In some embodiments, after receiving the slide operation signal of which the start position is on the second virtual object and of which the end position is on the first virtual object, the terminal may further perform the following steps.

1. Display an item purchase interface in a case that the first user account corresponding to the first virtual object does not possess the virtual item of the second virtual object.

2. Acquire a purchase instruction inputted in the item purchase interface.

3. Purchase the virtual item of the second virtual object according to the purchase instruction.

4. Perform, after the purchase succeeds, the operation of adjusting the virtual item of the first virtual object to render an adjusted virtual item of the first virtual object the same as the virtual item of the second virtual object.

The item purchase interface is a UI for virtual item purchase. Optionally, the item purchase interface is displayed on top of the game interface in a floating window form. The item purchase interface includes a virtual item included in the virtual items of the second virtual object but not possessed by the first user account.

Optionally, a quantity of the virtual items of the second virtual object is assumed as a, a being a positive integer. There are b virtual items that are among the foregoing a virtual items and that are not possessed by the first user account, b being a positive integer less than or equal to a. The terminal displays identifiers of the b virtual items on the item purchase interface and a first operation control used for trigging purchase of the b virtual items. An identifier of a virtual item is used for uniquely indicating the virtual item. For example, an identifier of a virtual item may include a name and/or an icon of the virtual item. The first operation control may be a button.

Figure 7:
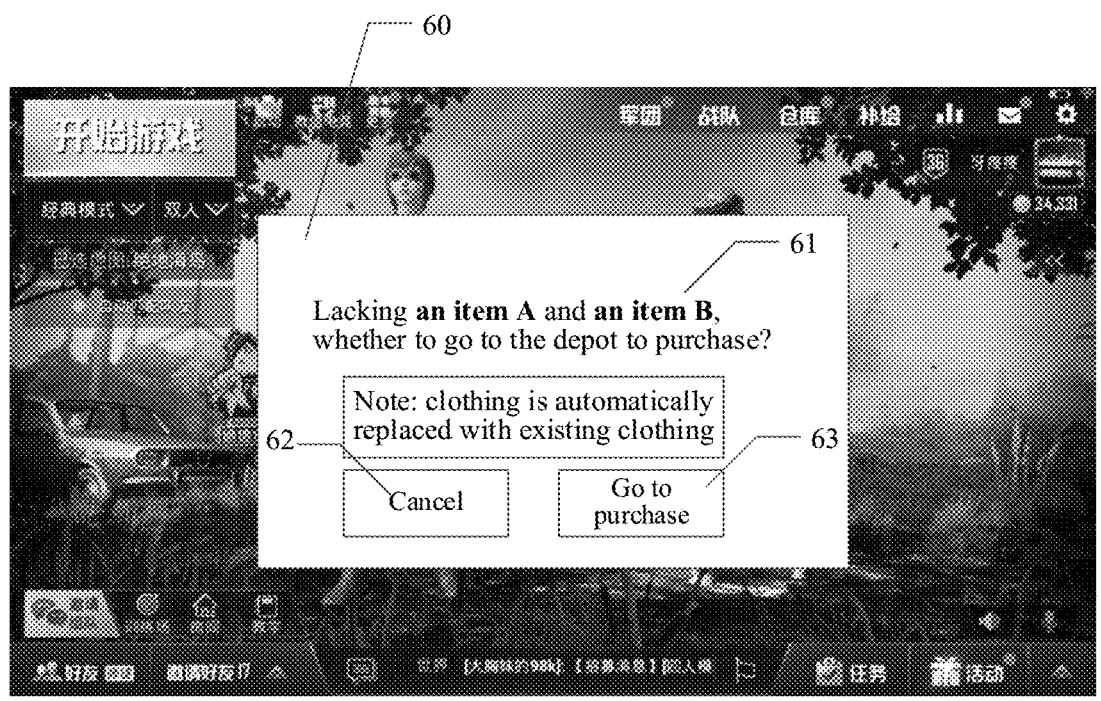
FIG. 7 is a schematic exemplary diagram of an item purchase interface.

In an example, as shown in FIG. 7, when the first user account corresponding to the first virtual object does not possess an item A and an item B, the terminal displays an item purchase interface 60. The item purchase interface 60 includes prompt information 61 used for prompting a user virtual items that the user lacks at present. The item purchase interface 60 further includes a "cancel" button 62 and a "go to purchase" button 63. The user clicks/taps the "cancel" button 62 to trigger a purchase cancel instruction, and the user clicks/taps the "go to purchase" button 63 to trigger a purchase instruction. After receiving the purchase instruction, the terminal may perform a virtual item purchase flow to purchase the item A and the item B.

In other embodiments, after receiving the slide operation signal of which the start position is on the second virtual object and of which the end position is on the first virtual object, the terminal may alternatively perform the following steps.

1. Display an item demanding interface in a case that the first user account corresponding to the first virtual object does not possess the virtual item of the second virtual object.

2. Acquire a demanding instruction inputted in the item demanding interface.

3. Transmit a demanding request to the second user account corresponding to the second virtual object according to the demanding instruction, the demanding request being used for requesting the second user account to donate the virtual item of the second virtual object to the first user account.

4. Perform, after the demand succeeds, the operation of adjusting the virtual item of the first virtual object to render an adjusted virtual item of the first virtual object the same as the virtual item of the second virtual object.

The item demanding interface is a UI for demanding a virtual item. Optionally, the item demanding interface is displayed on top of the game interface in a floating window form. The item demanding interface includes a virtual item included in the virtual items of the second virtual object but not possessed by the first user account.

Optionally, a quantity of the virtual items of the second virtual object is assumed as a, a being a positive integer. There are b virtual items that are among the foregoing a virtual items and that are not possessed by the first user account, b being a positive integer less than or equal to a. The terminal displays identifiers of the b virtual items on the item demanding interface and a second operation control used for triggering demand of the b virtual items. An identifier of a virtual item is used for uniquely indicating the virtual item. For example, an identifier of a virtual item may include a name and/or an icon of the virtual item. The second operation control may be a button.

Optionally, after the second user account receives the foregoing demanding request, demanding prompt information is displayed. The demanding prompt information is used for prompting a user that the first user account demands virtual items from the second user account. Optionally, the demanding prompt information includes identifiers of the demanded virtual items, that is, identifiers of the foregoing b virtual items that the first user account does not possess. The user may trigger a demand accept instruction or a demand reject instruction according to the demanding prompt information. If the second user account receives the demand accept instruction, the second user account transmits a demand success response to the first user account. In addition, in a case that the demand succeeds, a server deletes the foregoing b virtual items from the virtual items possessed by the second user account and adds the foregoing b virtual items to the virtual items possessed by the first user account.

Figure 8:
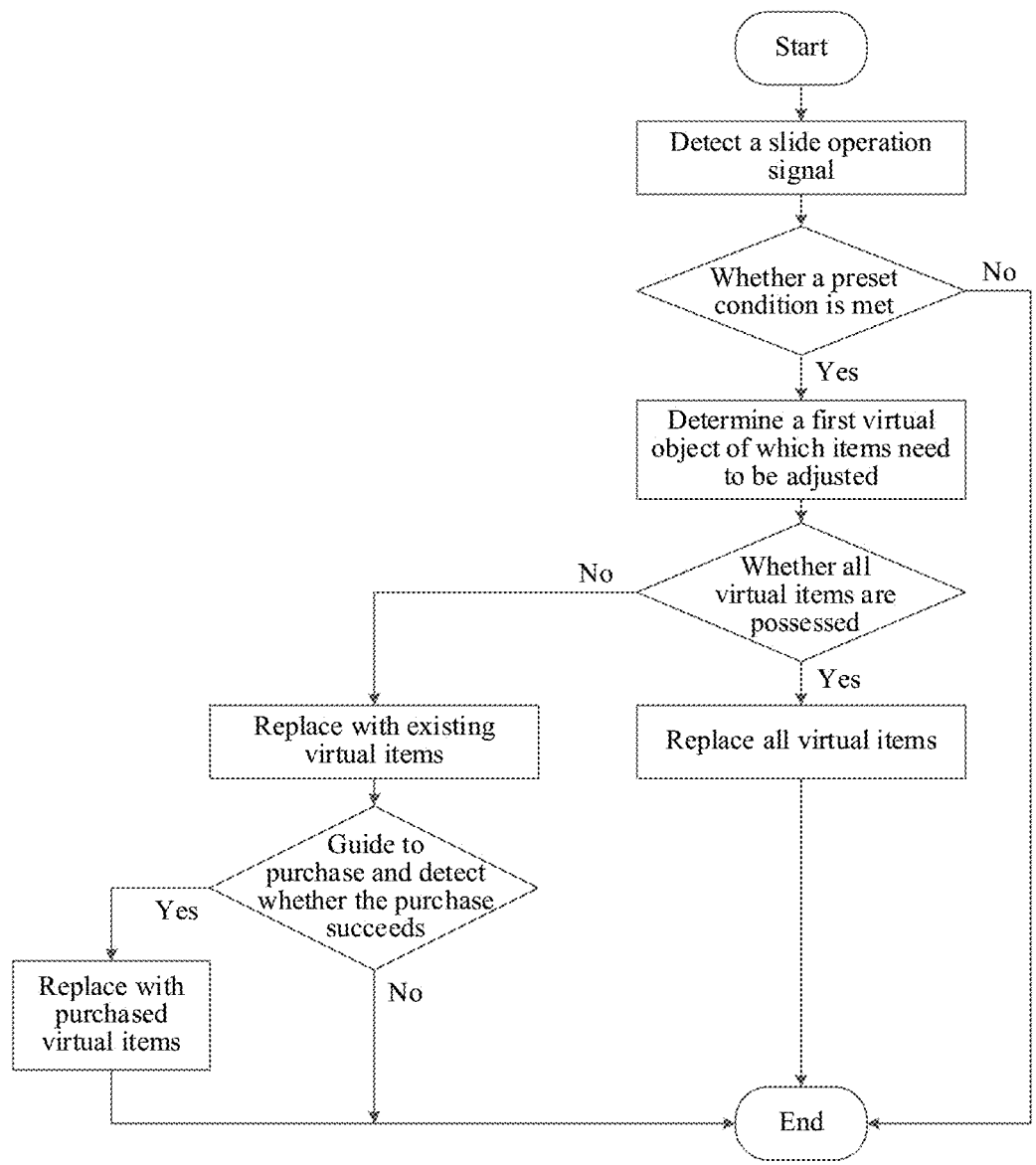
FIG. 8 is a schematic exemplary diagram of a virtual item adjustment flow.

FIG. 8 is a schematic exemplary diagram of a virtual item adjustment flow. When a slide operation signal corresponding to a game interface is detected by a terminal, the terminal determines whether the slide operation signal meets a preset condition, for example, the preset condition includes that a start position of the slide operation signal is on a second virtual object and an end position of the slide operation signal is on a first virtual object; when the slide operation signal meets the preset condition, the terminal determines a virtual object of which items need to be adjusted (for example, the first virtual object); the terminal then determines whether a first user account corresponding to the first virtual object possesses all virtual items of the second virtual object; if the first user account corresponding to the first virtual object possesses all the virtual items of the second virtual object, the terminal replaces all virtual items of the first virtual object with all the virtual items of the second virtual object to render the two virtual objects outfitted with the same virtual items; if the first user account corresponding to the first virtual object does not possess all the virtual items of the second virtual object, the terminal replaces the virtual items of the first virtual object with virtual items that are of the second virtual object and that are already possessed by the first user account and displays an item purchase interface to guide a user to purchase virtual items that are of the second virtual object and that are not possessed by the first user account; if the purchase succeeds, the terminal outfits the first virtual object with the purchased virtual items to render the two virtual objects outfitted with the same virtual items; and if the purchase fails, the terminal terminates the flow.

Based on the above, in the technical solutions provided in this embodiment of this application, a virtual item of a first virtual object is adjusted to render an adjusted virtual item of the first virtual object the same as a virtual item of a second virtual object, so that the function of quickly adjusting the virtual item of the first virtual object is implemented.

In addition, when a first user account corresponding to the first virtual object does not possess a related virtual item, the related virtual item can be quickly acquired in manners such as purchasing or demanding.

In another optional embodiment provided based on the embodiment in FIG. 3 or the embodiment in FIG. 4, the foregoing step 303 or the foregoing step 403 may be replaced and implemented by the following step: exchanging the virtual item of the first virtual object and the virtual item of the second virtual object.

Optionally, using an example in which the virtual item is virtual clothing, the terminal outfits the first virtual object with virtual clothing of the second virtual object and outfits the second virtual object with virtual clothing of the first virtual object, so that the function of quickly exchanging clothing of two virtual objects is implemented.

In addition, considering that there may be a plurality of virtual items with which the virtual object can be outfitted, for example, body parts such as the head, the upper body, the lower body, and the feet are respectively outfitted with virtual clothing such as a hat, a top, trousers, and shoes, there may be two possible implementations in the following for the terminal to exchange the virtual item of the first virtual object and the virtual item of the second virtual object.

In a first possible implementation, the terminal exchanges all virtual items of the first virtual object and all virtual items of the second virtual object.

In a second possible implementation, the terminal exchanges a virtual item on a target part of the first virtual object and a virtual item on a target part of the second virtual object. Optionally, the target part is a part where the start position of the slide operation signal is located on the second virtual object, or the target part is a part where the end position of the slide operation signal is located on the first virtual object. For example, when the part where the start position of the slide operation signal is located on the second virtual object is the lower body, and the part where the end position of the slide operation signal is located on the first virtual object is also the lower body, the terminal exchanges a virtual item (for example, trousers A) on the lower body of the first virtual object and a virtual item (for example, trousers B) on the lower body of the second virtual object.

Optionally, when the part where the start position of the slide operation signal is located on the second virtual object is the same as the part where the end position of the slide operation signal is located on the first virtual object, the terminal exchanges a virtual item on the part of the first virtual object and a virtual item on the part of the second virtual object; otherwise, when the part where the start position of the slide operation signal is located on the second virtual object is different from the part where the end position of the slide operation signal is located on the first virtual object, the terminal does not perform the virtual item exchange operation and terminates the flow. An exchange between virtual items on a particular part rather than all virtual items of virtual objects can be implemented by using the foregoing method.

In some embodiments, after receiving the slide operation signal of which the start position is on the second virtual object and of which the end position is on the first virtual object, the terminal may further perform the following steps.

1. Transmit an item exchange request to the second user account corresponding to the second virtual object, the item exchange request being used for requesting an exchange between the virtual item of the first virtual object and the virtual item of the second virtual object.

2. Perform the foregoing step of exchanging the virtual item of the first virtual object and the virtual item of the second virtual object in a case that an exchange-agreed response fed back by the second user account is received.

After the second user account receives the item exchange request, exchange prompt information may be displayed. The exchange prompt information is used for prompting a user corresponding to the second user account that a user corresponding to the first user account requests a virtual item exchange between the first virtual object and the second virtual object with the user corresponding to the second virtual object. The user corresponding to the second user account may trigger an agree-to-exchange instruction or a reject-to-exchange instruction according to the exchange prompt information. If the second user account receives the agree-to-exchange instruction, the second user account transmits an exchange-agreed response to the first user account.

Based on the above, in the technical solutions provided in this embodiment of this application, a virtual item of a first virtual object and a virtual item of a second virtual object are exchanged, so that the function of quickly exchanging virtual items of two virtual objects is implemented.

In addition, when an exchange of virtual items with the second virtual object is required, performing the exchange operation after permission of the second user account corresponding to the second virtual object is obtained is advantageous to improving user experience.

The following is apparatus embodiments of this application that can be used for performing the method embodiments of this application. For details not disclosed in the apparatus embodiments of this application, refer to the method embodiments of this application.

Figure 9:
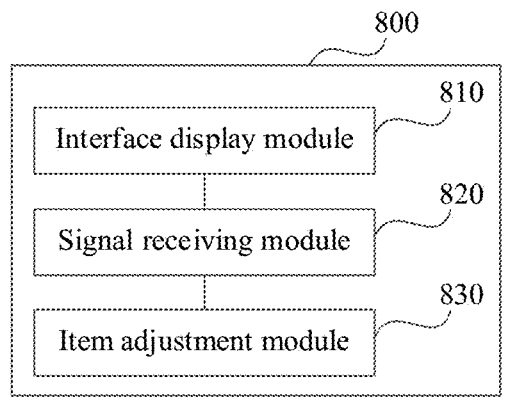
FIG. 9 is a block diagram of a virtual item adjustment apparatus according to an embodiment of this application.

FIG. 9 is a block diagram of a virtual item adjustment apparatus according to an embodiment of this application. The apparatus has functions of implementing the foregoing method examples. The functions may be implemented by using hardware, or may be implemented by hardware executing corresponding software. The apparatus 800 may include an interface display module 810, a signal receiving module 820, and an item adjustment module 830.

The interface display module 810 is configured to display a virtual object presenting interface, the virtual object presenting interface including a first virtual object and a second virtual object, the first virtual object and the second virtual object being two virtual objects respectively controlled by two different user accounts.

The signal receiving module 820 is configured to receive a slide operation signal of which a start position is on the second virtual object and of which an end position is on the first virtual object.

The item adjustment module 830 is configured to adjust a virtual item of the first virtual object and/or a virtual item of the second virtual object.

Based on the above, in the technical solutions provided in this embodiment of this application, when a slide operation signal of which a start position is on a second virtual object and of which an end position is on a first virtual object is received, a virtual item of the first virtual object and/or a virtual item of the second virtual object are/is adjusted, so that the function of adjusting a virtual item of a virtual object is implemented only through a slide operation. Therefore, the operation becomes simpler and more efficient.

In an optional embodiment provided based on the embodiment in FIG. 9, the item adjustment module 830 is configured to:

adjust the virtual item of the first virtual object to render an adjusted virtual item of the first virtual object the same as the virtual item of the second virtual object.

Optionally, the apparatus 800 further includes: an item purchase module;

the item purchase module is configured to display an item purchase interface in a case that a first user account corresponding to the first virtual object does not possess the virtual item of the second virtual object; acquire a purchase instruction inputted in the item purchase interface; and purchase the virtual item of the second virtual object according to the purchase instruction; and the item adjustment module 830 is further configured to adjust, after the purchase succeeds, the virtual item of the first virtual object to render an adjusted virtual item of the first virtual object the same as the virtual item of the second virtual object.

Optionally, the apparatus 800 further includes: an item demanding module;

the item demanding interface is configured to display an item demanding interface in a case that a first user account corresponding to the first virtual object does not possess the virtual item of the second virtual object; acquire a demanding instruction inputted in the item demanding interface; and transmit a demanding request to a second user account corresponding to the second virtual object according to the demanding instruction, the demanding request being used for requesting the second user account to donate the virtual item of the second virtual object to the first user account; and the item adjustment module 830 is further configured to adjust, after the demand succeeds, the virtual item of the first virtual object to render an adjusted virtual item of the first virtual object the same as the virtual item of the second virtual object.

In another optional embodiment provided based on the embodiment in FIG. 9, the item adjustment module 830 is configured to:

exchange the virtual item of the first virtual object and the virtual item of the second virtual object.

Optionally, the apparatus 800 further includes: an exchange request module;

the exchange request module is configured to transmit an item exchange request to a second user account corresponding to the second virtual object, the item exchange request being used for requesting an exchange between the virtual item of the first virtual object and the virtual item of the second virtual object; and the item adjustment module 830 is further configured to exchange the virtual item of the first virtual object and the virtual item of the second virtual object in a case that an exchange-agreed response fed back by the second user account is received.

In another optional embodiment provided based on the embodiment in FIG. 9 or the foregoing optional embodiments, the virtual item includes at least one of the following: virtual clothing, virtual equipment, a character skin, and a virtual pet.

When the apparatus provided in the foregoing embodiments implements functions of the apparatus, description is provided only by using an example of division of each function module. During actual application, according to the requirements, the functions may be allocated to different function modules for implementation, that is, the internal structure of the device is divided into different function modules, to implement all or some of the functions described above. In addition, the apparatus and method embodiments provided in the foregoing embodiments belong to one conception. For the specific implementation process, refer to the method embodiments, and details are not described herein again.

Figure 10:
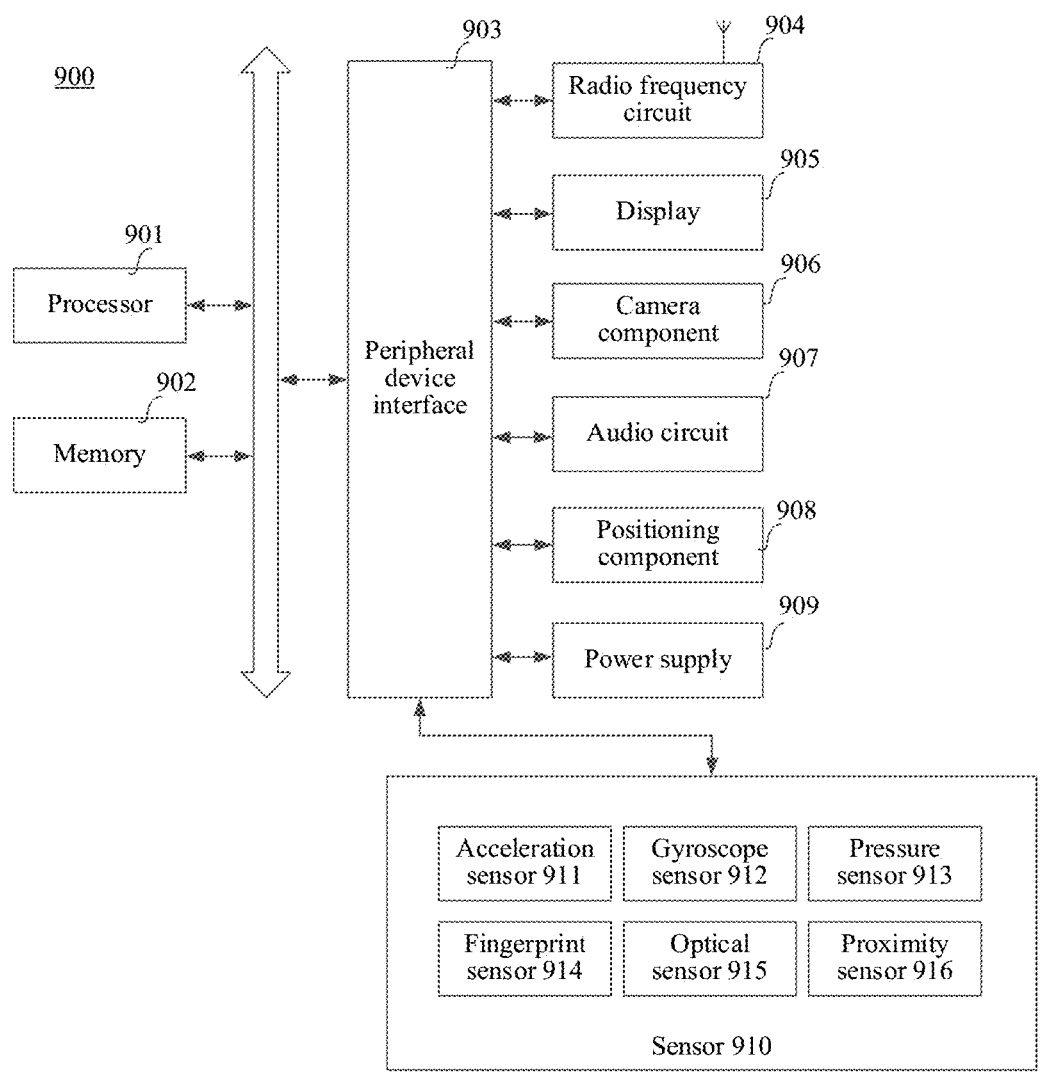
FIG. 10 is a structural block diagram of a terminal according to an embodiment of this application.

FIG. 10 is a structural block diagram of a terminal 900 according to an embodiment of this application. The terminal 900 may be a mobile phone, a tablet computer, a game console, an ebook reader, a multimedia player, a wearable device, a PC, and the like.

Generally, the terminal 900 includes a processor 901 and a memory 902.

The processor 901 may include one or more processing cores, for example, may be a 4-core processor or an 8-core processor. The processor 901 may be implemented by using at least one hardware form of digital signal processing (DSP), a field-programmable gate array (FPGA), and a programmable logic array (PLA). The processor 901 may alternatively include a main processor and a coprocessor. The main processor is configured to process data in an awake state, also referred to as a central processing unit (CPU), and the coprocessor is a low-power processor configured to process data in a standby state. In some embodiments, the processor 901 may be integrated with a graphics processing unit (GPU). The GPU is configured to be responsible for rendering and drawing content that a display needs to display. In some embodiments, the processor 901 may further include an artificial intelligence (AI) processor. The AI processor is configured to process a calculation operation related to machine learning.

The memory 902 may include one or more computer-readable storage media. The computer-readable storage medium may be non-transient. The memory 902 may further include a high-speed random access memory and a non-volatile memory such as one or more magnetic disk storage devices and a flash storage device. In some embodiments, the non-transitory computer-readable storage medium in the memory 902 is configured to store at least one instruction, the at least one instruction being executed by the processor 901 to implement the method provided in the method embodiments of this application.

In some embodiments, the terminal 900 further optionally includes a peripheral device interface 903 and at least one peripheral device. The processor 901, the memory 902, and the peripheral device interface 903 may be connected through a bus or a signal cable. Each peripheral device may be connected to the peripheral device interface 903 through a bus, a signal cable, or a circuit board. Specifically, the peripheral device includes: at least one of a radio frequency (RF) circuit 904, a touch display 905, a camera component 906, an audio circuit 907, a positioning component 908, and a power supply 909.

The peripheral device interface 903 may be configured to connect at least one peripheral device related to input/output (I/O) to the processor 901 and the memory 902. In some embodiments, the processor 901, the memory 902, and the peripheral device interface 903 are integrated into one chip or circuit board; in some other embodiments, any one or two of the processor 901, the memory 902, and the peripheral device interface 903 may be implemented on an independent chip or circuit board. This is not limited in this embodiment.

The RF circuit 904 is configured to receive and transmit an RF signal, which is also referred to as an electromagnetic signal. The RF circuit 904 communicates with a communication network and another communication device by using the electromagnetic signal. The RF circuit 904 converts an electric signal into an electromagnetic signal for transmission, or converts a received electromagnetic signal into an electric signal. Optionally, the RF circuit 904 includes: an antenna system, an RF transceiver, one or more amplifiers, a tuner, an oscillator, a digital signal processor, a codec chip set, a subscriber identity module card, and the like. The RF circuit 904 may communicate with other devices through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 904 may also include a circuit related to near field communication (NFC). This is not limited in this application.

The display 905 is configured to display a UI. The UI may include a graph, a text, an icon, a video, and any combination thereof. When the display 905 is a touch display, the display 905 is further capable of acquiring a touch signal on or above a surface of the display 905. The touch signal may be inputted into the processor 901 as a control signal for processing. In this case, the display 905 may be further configured to provide a virtual button and/or a virtual keyboard, also referred to as a soft button and/or a soft keyboard. In some embodiments, there is one display 905, disposed on a front panel of the terminal 900. In some other embodiments, there may be two displays 905, respectively disposed on different surfaces of the terminal 900 or designed in a foldable shape. In still some other embodiments, the display 905 may be a flexible display, disposed on a curved surface or a folded surface of the terminal 900. Even, the display 905 may be further set to have a non-rectangular irregular graph, that is, a special-shaped screen. The display 905 may be manufactured by using a material such as a liquid crystal display (LCD), an organic light-emitting diode (OLED), or the like.

The camera component 906 is configured to acquire an image or a video. Optionally, the camera component 906 includes a front-facing camera and a rear-facing camera. Generally, the front-facing camera is disposed on the front panel of a computer device, and the rear-facing camera is disposed on a back surface of the computer device. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 906 may further include a flash. The flash may be a single color temperature flash, or may be a double color temperature flash. The double color temperature flash is a combination of a warm light flash and a cold light flash, and may be used for light compensation under different color temperatures.

The audio circuit 907 may include a microphone and a speaker. The microphone is configured to: acquire sound waves of a user and an environment, and convert the sound waves into electrical signals and input the electrical signals into the processor 901 for processing, or input the electrical signals into the RF circuit 904 to implement speech communication. For the purpose of stereo collection or noise reduction, there may be a plurality of microphones, disposed at different parts of the terminal 900 respectively. The microphone may be further an array microphone or an omnidirectional collection microphone. The speaker is configured to convert electrical signals from the processor 901 or the RF circuit 904 into sound waves. The speaker may be a conventional thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 907 may further include an earphone jack.

The positioning component 908 is configured to locate a current geographic location of the terminal 900, to implement a navigation or a location based service (LBS). The positioning component 908 may be a positioning component based on the Global Positioning System (GPS) of the United States, the BeiDou system of China, the GLONASS System of Russia, or the GALILEO System of the European Union.

The power supply 909 is configured to supply power for various components in the terminal 900. The power supply 909 may be an alternating current, a direct current, a disposable battery, or a rechargeable battery. When the power supply 909 includes a rechargeable battery, the rechargeable battery may be a wired rechargeable battery or a wireless rechargeable battery. The rechargeable battery may further be configured to support a quick charge technology.

In some embodiments, the terminal 900 may also include one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 may measure acceleration on three coordinate axes of a coordinate system established by the terminal 900. For example, the acceleration sensor 911 may be configured to detect components of gravity acceleration on the three coordinate axes. The processor 901 may control, according to a gravity acceleration signal collected by the acceleration sensor 911, the touch display 905 to display the UI in a frame view or a portrait view. The acceleration sensor 911 may be further configured to collect motion data of a game or a user.

The gyroscope sensor 912 may detect a body direction and a rotation angle of the terminal 900. The gyroscope sensor 912 may cooperate with the acceleration sensor 911 to collect a 3D action by the user on the terminal 900. The processor 901 may implement the following functions according to the data collected by the gyroscope sensor 912: motion sensing (such as changing the UI according to a tilt operation of the user), image stabilization during shooting, game control, and inertial navigation.

The pressure sensor 913 may be disposed on a side frame of the terminal 900 and/or a lower layer of the display 905. When the pressure sensor 913 is disposed on the side frame of the terminal 900, a holding signal of the user on the terminal 900 may be detected. The processor 901 performs left and right hand recognition or a quick operation according to the holding signal collected by the pressure sensor 913. When the pressure sensor 913 is disposed on the lower layer of the touch display 905, the processor 901 controls an operable control on the UI according to a pressure operation of the user on the touch display 905. The operable control includes at least one of a button control, a scroll bar control, an icon control and a menu control.

The fingerprint sensor 914 is configured to collect a fingerprint of a user, and the processor 901 identifies the identity of the user according to the fingerprint collected by the fingerprint sensor 914, or the fingerprint sensor 914 identifies the identity of the user according to the collected fingerprint. When the identity of the user is identified as a trusted identity, the processor 901 authorizes the user to perform a related sensitive operation. The sensitive operation includes unlocking a screen, viewing encrypted information, downloading software, payment, changing settings, and the like. The fingerprint sensor 914 may be disposed on a front surface, a back surface, or a side surface of the terminal 900. When a physical button or a vendor logo is disposed on the terminal 900, the fingerprint sensor 914 may be integrated with the physical button or the vendor logo.

The optical sensor 915 is configured to collect ambient light intensity. In an embodiment, the processor 901 may control the display brightness of the touch display 905 according to the ambient light intensity collected by the optical sensor 915. Specifically, when the ambient light intensity is relatively high, the display brightness of the touch display 905 is turned up. When the ambient light intensity is relatively low, the display brightness of the touch display 905 is turned down. In another embodiment, the processor 901 may further dynamically adjust a camera parameter of the camera component 906 according to the ambient light intensity collected by the optical sensor 915.

The proximity sensor 916, also referred to as a distance sensor, is usually disposed on a front panel of the terminal 900. The proximity sensor 916 is configured to collect a distance between a user and the front surface of the terminal 900. In an embodiment, when the proximity sensor 916 detects that the distance between the user and the front surface of the terminal 900 gradually decreases, the touch display 905 is controlled by the processor 901 to switch from a screen-on state to a screen-off state. When the proximity sensor 916 detects that the distance between the user and the front surface of the terminal 900 gradually increases, the touch display 905 is controlled by the processor 901 to switch from the screen-off state to the screen-on state.

A person skilled in the art may understand that the structure shown in FIG. 10 does not constitute a limitation on the terminal 900, and the terminal may include more or fewer components than those shown in the figure, or some components may be combined, or a different component deployment may be used.

In an exemplary embodiment, a terminal is provided, including a processor and a memory, the memory storing at least one instruction, at least one program, a code set, or an instruction set, the at least one instruction. The at least one instruction, the at least one program, the code set, or the instruction set is configured to be executed by one or more processors to implement the foregoing virtual item adjustment method.

In an exemplary embodiment, a non-transitory computer-readable storage medium is further provided, the storage medium storing at least one instruction, at least one program, a code set or an instruction set, and the at least one instruction, the at least one program, the code set or the instruction set being executed by the processor of a computer device to implement the foregoing virtual item adjustment method.

Optionally, the computer readable storage medium may be a read only memory (ROM), a random access memory (RAM), a compact disc read-only memory (CD-ROM), a magnetic tape, a floppy disk, an optical data storage device, or the like.

In an exemplary embodiment, a computer program product is provided, when executed, the computer program product is used for implementing the foregoing virtual item adjustment method.

It is to be understood that "a plurality of" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application.

What is claimed is:

1. A virtual item adjustment method, performed at a computing device having one or more processors, a touchscreen and memory storing a plurality of computer programs to be executed by the one or more processors, the method comprising:

displaying a virtual object presenting interface within a game interface on the touchscreen, the virtual object presenting interface comprising a first virtual object and a second virtual object, the first virtual object and the second virtual object being two virtual objects respectively controlled by a first user account and a second user account, different from the first user account;

receiving a slide operation signal on the touchscreen from the first user account, the slide operation signal having a start position on the second virtual object controlled by the second user account, and an end position on the first virtual object controlled by the first user account; and adjusting a virtual item of the first virtual object according to a virtual item of the second virtual object without adjusting the virtual item of the second virtual object, including adjusting the virtual item of the first virtual object to render an adjusted virtual item of the first virtual object the same as the virtual item of the second virtual object.

2. The method according to claim 1, wherein the method further comprises:
after receiving the slide operation signal on the touchscreen,
displaying an item purchase interface on the touchscreen when a first user account corresponding to the first virtual object does not possess the virtual item of the second virtual object;
acquiring a purchase instruction inputted in the item purchase interface;
purchasing the virtual item of the second virtual object according to the purchase instruction; and
performing, after the purchase succeeds, the operation of adjusting the virtual item of the first virtual object to render an adjusted virtual item of the first virtual object the same as the virtual item of the second virtual object.

3. The method according to claim 1, wherein the method further comprises:
after receiving the slide operation signal on the touchscreen,
displaying an item demanding interface on the touchscreen when a first user account corresponding to the first virtual object does not possess the virtual item of the second virtual object;
acquiring a demanding instruction inputted in the item demanding interface;
transmitting a demanding request to a second user account corresponding to the second virtual object according to the demanding instruction, the demanding request being used for requesting the second user account to donate the virtual item of the second virtual object to the first user account; and
performing, after the demand succeeds, the operation of adjusting the virtual item of the first virtual object to render an adjusted virtual item of the first virtual object the same as the virtual item of the second virtual object.

4. The method according to claim 1, wherein the adjusting a virtual item of the first virtual object according to a virtual item of the second virtual object comprises:
exchanging the virtual item of the first virtual object and the virtual item of the second virtual object.

5. The method according to claim 4, wherein the method further comprises:
after receiving the slide operation signal on the touchscreen,
transmitting an item exchange request to a second user account corresponding to the second virtual object, the item exchange request being used for requesting an exchange between the virtual item of the first virtual object and the virtual item of the second virtual object; and
performing the operation of exchanging the virtual item of the first virtual object and the virtual item of the second virtual object in a case that an exchange-agreed response fed back by the second user account is received.

6. The method according to claim 1, wherein the virtual item comprises at least one of the following: virtual clothing, virtual equipment, a character skin, and a virtual pet.

7. A computing device comprising one or more processors, a touchscreen, memory and a plurality of computer programs stored in the memory that, when executed by the one or more processors, cause the computing device to perform a plurality of operations including:
displaying a virtual object presenting interface within a game interface on the touchscreen, the virtual object presenting interface comprising a first virtual object and a second virtual object, the first virtual object and the second virtual object being two virtual objects respectively controlled a first user account and a second user account, different from the first user account;
receiving a slide operation signal on the touchscreen from the first user account, the slide operation signal having a start position on the second virtual object controlled by the second user account, and an end position on the first virtual object controlled by the first user account; and
adjusting a virtual item of the first virtual object according to a virtual item of the second virtual object without adjusting the virtual item of the second virtual object, including adjusting the virtual item of the first virtual object to render an adjusted virtual item of the first virtual object the same as the virtual item of the second virtual object.

8. The computing device according to claim 7, wherein the plurality of operations further comprise:
after receiving the slide operation signal on the touchscreen,
displaying an item purchase interface on the touchscreen when a first user account corresponding to the first virtual object does not possess the virtual item of the second virtual object;
acquiring a purchase instruction inputted in the item purchase interface;
purchasing the virtual item of the second virtual object according to the purchase instruction; and
performing, after the purchase succeeds, the operation of adjusting the virtual item of the first virtual object to render an adjusted virtual item of the first virtual object the same as the virtual item of the second virtual object.

9. The computing device according to claim 7, wherein the plurality of operations further comprise:
after receiving the slide operation signal on the touchscreen,
displaying an item demanding interface on the touchscreen when a first user account corresponding to the first virtual object does not possess the virtual item of the second virtual object;
acquiring a demanding instruction inputted in the item demanding interface;
transmitting a demanding request to a second user account corresponding to the second virtual object according to the demanding instruction, the demanding request being used for requesting the second user account to donate the virtual item of the second virtual object to the first user account; and
performing, after the demand succeeds, the operation of adjusting the virtual item of the first virtual object to render an adjusted virtual item of the first virtual object the same as the virtual item of the second virtual object.

10. The computing device according to claim 7, wherein the adjusting a virtual item of the first virtual object according to a virtual item of the second virtual object comprises:
exchanging the virtual item of the first virtual object and the virtual item of the second virtual object.

11. The computing device according to claim 10, wherein the plurality of operations further comprise:
after receiving the slide operation signal on the touchscreen,
transmitting an item exchange request to a second user account corresponding to the second virtual object, the item exchange request being used for requesting an exchange between the virtual item of the first virtual object and the virtual item of the second virtual object; and performing the operation of exchanging the virtual item of the first virtual object and the virtual item of the second virtual object in a case that an exchange-agreed response fed back by the second user account is received.

12. The computing device according to claim 7, wherein the virtual item comprises at least one of the following: virtual clothing, virtual equipment, a character skin, and a virtual pet.

13. A non-transitory computer-readable storage medium, storing a plurality of computer programs that, when executed by one or more processors of a computing device having a touchscreen, cause the computing device to perform a plurality of operations including:

displaying a virtual object presenting interface within a game interface on the touchscreen, the virtual object presenting interface comprising a first virtual object and a second virtual object, the first virtual object and the second virtual object a first user account and a second user account, different from the first user account;

receiving a slide operation signal on the touchscreen from the first user account, the slide operation signal having a start position on the second virtual object controlled by the second user account, and an end position on the first virtual object controlled by the first user account; and adjusting a virtual item of the first virtual object according to a virtual item of the second virtual object without adjusting the virtual item of the second virtual object, including adjusting the virtual item of the first virtual object to render an adjusted virtual item of the first virtual object the same as the virtual item of the second virtual object.

14. The non-transitory computer-readable storage medium according to claim 13, wherein the plurality of operations further comprise:

after receiving the slide operation signal on the touchscreen, displaying an item purchase interface on the touchscreen when a first user account corresponding to the first virtual object does not possess the virtual item of the second virtual object;

acquiring a purchase instruction inputted in the item purchase interface;

purchasing the virtual item of the second virtual object according to the purchase instruction; and performing, after the purchase succeeds, the operation of adjusting the virtual item of the first virtual object to render an adjusted virtual item of the first virtual object the same as the virtual item of the second virtual object.

15. The non-transitory computer-readable storage medium according to claim 13, wherein the adjusting a virtual item of the first virtual object according to a virtual item of the second virtual object comprises:

exchanging the virtual item of the first virtual object and the virtual item of the second virtual object.

16. The non-transitory computer-readable storage medium according to claim 15, wherein the plurality of operations further comprise:

after receiving the slide operation signal on the touchscreen, transmitting an item exchange request to a second user account corresponding to the second virtual object, the item exchange request being used for requesting an exchange between the virtual item of the first virtual object and the virtual item of the second virtual object; and performing the operation of exchanging the virtual item of the first virtual object and the virtual item of the second virtual object in a case that an exchange-agreed response fed back by the second user account is received.

17. The non-transitory computer-readable storage medium according to claim 13, wherein the virtual item comprises at least one of the following: virtual clothing, virtual equipment, a character skin, and a virtual pet.

* * * * *